US006646395B2

(12) United States Patent
Reimann

(10) Patent No.: US 6,646,395 B2
(45) Date of Patent: Nov. 11, 2003

(54) THROTTLE BODY

(75) Inventor: Christian Reimann, Wehrheim (DE)

(73) Assignee: Mannesmann VDO AG, Frankfurt (DE)

( * ) Notice: Subject to any disclaimer, the term of this patent is extended or adjusted under 35 U.S.C. 154(b) by 86 days.

(21) Appl. No.: 09/780,999

(22) Filed: Feb. 8, 2001

(65) Prior Publication Data

US 2001/0030518 A1 Oct. 18, 2001

(30) Foreign Application Priority Data

Feb. 18, 2000 (DE) ........................................ 100 07 611

(51) Int. Cl.[7] ........................ F16K 31/102; F16K 1/22; F02D 9/08

(52) U.S. Cl. .................. 318/254; 251/129.11; 251/305; 123/336; 123/337; 123/399

(58) Field of Search ................................ 123/336, 337, 123/399; 251/305, 306, 307, 308, 304

(56) References Cited

U.S. PATENT DOCUMENTS

| | | | | |
|---|---|---|---|---|
| 3,790,130 A | * | 2/1974 | Getty, Jr. | 123/399 |
| 3,877,678 A | * | 4/1975 | Jung | 251/305 |
| 3,958,595 A | * | 5/1976 | Al et al. | 137/375 |
| 4,377,181 A | * | 3/1983 | Chan | 251/305 |
| 4,671,245 A | * | 6/1987 | Knapp | 251/306 |
| 4,876,492 A | * | 10/1989 | Lester et al. | 251/129.11 |
| 4,905,647 A | * | 3/1990 | Kizer et al. | 123/337 |
| 4,951,772 A | * | 8/1990 | Peter et al. | 123/396 |
| 5,007,395 A | * | 4/1991 | Wakeling | 123/337 |
| 5,188,078 A | * | 2/1993 | Tamaki | 62/228.4 |
| 5,341,773 A | * | 8/1994 | Schulte et al. | 123/184.61 |
| 5,431,141 A | * | 7/1995 | Kanazawa et al. | 123/361 |
| 5,485,542 A | * | 1/1996 | Ericson | 137/375 |
| 5,551,666 A | * | 9/1996 | Irnich | 251/160 |
| 5,615,861 A | * | 4/1997 | Pollmann et al. | 123/403 |
| 5,632,245 A | * | 5/1997 | Ropertz | 251/248 |

(List continued on next page.)

FOREIGN PATENT DOCUMENTS

| | | | | |
|---|---|---|---|---|
| DE | 4126366 A1 | * | 2/1993 | F02D/9/10 |
| DE | 19516584 | | 11/1996 | F02D/9/00 |
| DE | 19540323 A1 | * | 4/1997 | F02D/9/10 |
| DE | 19704012 A1 | * | 8/1998 | F02D/9/10 |
| DE | 19854595 | | 6/2000 | F02D/9/10 |
| EP | 0337099 | | 10/1989 | |
| EP | 1051567 | | 11/2000 | |
| FR | WO98/48204 | * | 10/1998 | F16K/1/226 |
| JP | 11132062 A | * | 5/1999 | F02D/9/10 |

OTHER PUBLICATIONS

Patent Abstracts of Japan; vol. 1999, No. 03, Mar. 31, 1999 & JP 10 331666 A (Asian Ind Co Ltd), Dec. 15, 1998.

Patent Abstracts of Japan; vol. 1999, No. 2, Feb. 26, 1999 & JP 10 306736 (Asian Ind Co Ltd), Nov. 17, 1998.

Patent Abstracts of Japan; vol. 1998, No. 14, Dec. 31, 1998 & JP 10 252460 (Nissan Motor Co Ltd), Sep. 22, 1998.

*Primary Examiner*—Robert E. Nappi
*Assistant Examiner*—Patrick Miller
(74) *Attorney, Agent, or Firm*—Martin A. Farber

(57) ABSTRACT

A invention relates to a throttle body which has at least one housing (14) and an actuator (18), which is arranged in the housing (14) and drives a moving element (6). The outlay on the production and assembly of the throttle body is particularly low while, at the same time, particularly severe heating of the actuator (18) is reliably avoided during operation of the actuator (18) wherein, the housing (14) is manufactured from plastic (K), and functional elements of the actuator (18) are arranged in the housing (14) and are at least partially surrounded by plastic (K). The moving element (6) is surrounded by a stub pipe (4), a functional element of the actuator (18) and the stub pipe (4) being connected to one another in a heat-conducting manner.

22 Claims, 2 Drawing Sheets

U.S. PATENT DOCUMENTS 5,655,500 A * 8/1997 Kato .......................... 123/337
5,672,818 A * 9/1997 Schaefer et al. ....... 251/129.12
5,687,691 A * 11/1997 Kaiser et al. ............... 251/160
5,711,271 A * 1/1998 Schlagmueller et al. .... 251/305
6,047,680 A * 4/2000 Shimura et al. .............. 73/116
6,113,069 A * 9/2000 Rauch ................... 123/184.61
6,239,562 B1 * 5/2001 Turner ........................ 123/399
6,240,899 B1 * 6/2001 Yamada et al. ............... 310/62
6,244,565 B1 * 6/2001 McDonnell et al. ... 251/129.12
6,295,968 B2 * 10/2001 Torii et al. .................. 123/399
6,300,697 B1 * 10/2001 Findeisen et al. ......... 310/68 B
6,364,284 B1 * 4/2002 Imada et al. ................ 123/337
6,378,491 B1 * 4/2002 Ino et al. .................... 123/337
6,386,151 B1 * 5/2002 Powell ....................... 123/337
6,412,752 B1 * 7/2002 Daly et al. ................ 310/68 B
2002/0104511 A1 * 8/2002 Torii et al. .................. 123/399

* cited by examiner

THROTTLE BODY

FIELD AND BACKGROUND OF THE INVENTION

The invention relates to a throttle body, which has at least one housing, a stub pipe arranged in the housing and accommodating a throttle butterfly, and an actuator, which drives the throttle butterfly.

A throttle body of this kind is known from EP 0 337 099 A2, which describes a device for controlling the power of an internal combustion engine provided for the purpose of driving vehicles. Here, the throttle body has a housing in which a positioning motor designed as an electric motor is arranged. Via transmission elements, such as a reduction gear, the actuator drives a moving element, which is a throttle butterfly for controlling the power of the internal combustion engine. However, the production of the device known from EP 0 337 099 A2 requires a particularly high outlay on production and assembly owing to the large number of parts to be produced and assembled.

In the case of a throttle body with an actuator, heat generated in the actuator during the operation of the actuator can lead to particularly severe heating of the components of the actuator. However, an actuator operated subject to continuous particularly severe heating is generally prone to faults and has a particularly short life. A particularly short life of the actuator, in turn, is associated with a particularly high outlay on the maintenance and repair of the throttle body, leading to extremely high costs for the operation of the throttle body.

SUMMARY OF THE INVENTION

The object on which the invention is based is therefore to indicate a throttle body of the above-mentioned type with which the outlay on production and assembly is particularly low while, at the same time, particularly severe heating of the actuator is reliably avoided.

According to the invention, this object is achieved by virtue of the fact that the housing is composed of plastic, and functional elements of the actuator are arranged in the housing and are at least partially surrounded by plastic, the throttle butterfly being surrounded by a heat-conducting stub pipe, a functional element of the actuator and the heat-conducting stub pipe being connected to one another in a heat-conducting manner or being of one-piece design.

The invention starts from the consideration that a throttle body that involves a particularly low outlay on production and assembly should have a particularly small number of parts. The number of parts to be assembled is particularly small if there is no need for a separate housing for the actuator and if it is possible to integrate functional elements of the actuator into the housing of the actuator. At the same time, it should be possible to adapt the housing to the spatial dimensions of the functional elements of the actuator in a particularly simple manner. For this purpose, the housing of the throttle body is manufactured from plastic, the housing of the throttle body being designed both as the housing of the throttle body and as the housing of the actuator.

In this arrangement, particularly severe heating of the actuator is reliably avoided if the heat generated in the actuator can be dissipated from the actuator during the operation of the actuator. However, the plastic housing of the throttle body and of the actuator proves unsuitable as a heat dissipation element since the housing of the throttle body and of the actuator should not heat up to a particularly great extent if the actuator is to function in a particularly reliable manner. The actuator should therefore have connected to it a heat conductor, via which the heat generated in the actuator can be dissipated from the actuator and the housing of the throttle body and of the actuator during the operation of the actuator. An additional component of the throttle body can be dispensed with here if a part that is provided in the throttle body in any case can be used as a heat conductor. For this purpose, a functional element of the actuator is connected in a heat-conducting manner to a stub pipe surrounding the throttle butterfly.

It is advantageous if the functional element of the actuator and the stub pipe are in direct contact with one another at at least one point. This ensures direct heat transfer from the functional element of the actuator to the stub pipe, as a result of which the throttle body has a particularly simple construction that has a particularly low susceptibility to faults. To compensate for inaccuracies of fit and for a particularly pronounced thermal conductivity, the connection between the two elements can be assisted by means of thermally conductive paste, for example.

It is advantageous if the stub pipe is composed essentially of metal. Metal is a particularly good heat conductor, ensuring particularly reliable dissipation of the heat generated in the actuator during the operation of the actuator. It is advantageous here if the stub pipe is composed essentially of aluminum. Components made of aluminum can be manufactured with a high accuracy of fit in a particularly simple manner, and the outlay required for the production of the throttle body is therefore particularly low. Moreover, aluminum is intrinsically particularly light, allowing the weight of the throttle body to be reduced to a particularly low level.

The heat absorbed by the stub pipe during the operation of the actuator is removed from the throttle body by the air flowing through the stub pipe. This is a particularly reliable way of avoiding heating of the actuator during the operation of the actuator.

It is advantageous if the stub pipe and the functional element of the actuator have means by which the stub pipe and the functional element of the actuator can be positioned relative to one another. It is advantageous if the means are domes. The word “domes” is used to denote form-locking joints by means of which a first component can be positioned relative to a second component. By virtue of these means, the outlay required for assembly in the production of the throttle body can be reduced to a particularly low level since the stub pipe and the functional element of the actuator can be connected to one another in a particularly simple manner, this being associated with particularly short assembly times for the throttle body. Moreover, this is a reliable way of avoiding inaccuracies of fit, caused by manufacturing tolerances, when joining the stub pipe and the functional element of the actuator together, and as a result the throttle body takes up a particularly small amount of space.

It is advantageous if the means by which the stub pipe and the functional element of the actuator can be positioned relative to one another can be produced both in one piece with the stub pipe and in one piece with the functional element of the actuator of the throttle body. This simplifies the production of the throttle body since there is no need for the additional process of fitting the respective domes. As an alternative or in addition, the means can be connecting elements, e.g. rivets, nails or screws, which can be secured both on the stub pipe and on the functional element of the actuator. As an alternative or in addition, it is furthermore also possible to make provision for the housing of the actuator and the stub pipe to be pressed against one another.

The housing can advantageously be manufactured from plastic by injection molding. An injection-molded housing allows the shape of the housing to be adapted in a particularly simple manner to different designs of the housing of the throttle body through the design of the injection mold. Moreover, the requisite functional elements of the actuator can be integrated into the housing in a particularly simple manner during the production of the latter. For this purpose, the functional elements are first of all placed in the injection mold. The functional elements are then sealed off from the injection mold at the points at which they are not to be surrounded by plastic, and the injection mold is then filled with plastic. In addition, further elements of the throttle body, such as bearings, electrical connections or the like, can also be inserted in or mounted on the plastic housing of the throttle body. This results in efficient production, especially in the series production of such throttle bodies since the outlay on the production and assembly of the throttle body can be particularly low in this case. To avoid electrical short circuits, an electrically nonconductive plastic should be provided for the production of the housing.

It is advantageous if the stub pipe is integrated into the housing of the throttle body. It is then not necessary to manufacture the plastic housing with tolerances at the points envisaged for joining the throttle body to the stub pipe. Moreover, there is also no need for a manufacturing process specifically designed for high accuracy of fit of the stub pipe if the housing automatically leads to the functional element of the actuator being joined to the stub pipe. As a result, the outlay for the production of the plastic housing is particularly low.

It is advantageous if the actuator is designed as an electric motor. An electric motor has a particularly low susceptibility to faults and is therefore particularly suitable for use in a throttle body.

It is advantageous if the actuator designed as an electric motor is a direct-current motor, also referred to by those skilled in the art as a DC motor. In this case, at least the return body of the electric motor is arranged in the plastic housing of the throttle body. For this purpose, one or more of these return bodies can be placed in the injection mold before the injection molding of the plastic housing and can be enclosed or encapsulated with plastic. As an alternative, however, it is also possible to provide for introduction of the return body into the housing of the throttle body at a later stage. By integrating functional elements into the plastic housing, it is possible to reduce to a particularly low level the number of components to be assembled in the case of electric motors with many poles. The throttle body has a particularly small number of components to be assembled if, as is advantageous, the return body is constructed in one piece as a so-called pole tube.

It is advantageous if the functional element of the actuator, which is connected in a thermally conductive manner to the stub pipe, is the pole tube of the electric motor. The pole tube, which is arranged in the outer region of the electric motor, is particularly suitable as a heat conductor since it surrounds the heat-generating functional elements of the actuator, such as the rotor. The pole tube is furthermore a functional element of the actuator that can be reached particularly easily from outside the actuator.

It is advantageous if the magnet shells of the electric motor designed as a direct-current motor are arranged at least partially in the plastic housing of the throttle body. If production of the plastic housing by injection molding is envisaged, it is also possible for the permanently magnetic magnet shells to be placed in the injection mold for the housing before the mold is filled, thus allowing the permanently magnetic magnet shells to be integrated into the plastic housing as further functional elements. As an alternative, however, insertion of the magnet shells into the housing of the throttle body at a later stage can also be envisaged. Insertion of the return bodies and of the magnet shells into the injection mold can be automated, allowing sources of error that cannot be excluded with manual assembly to be avoided by machine-based manufacture.

When integrating the permanently magnetic magnet shells into the plastic housing, these can furthermore be completely enclosed by plastic. The enclosure of the magnet shells is not restricted to the ends and longitudinal sides but also includes the area of the circumferential surface of the magnet shells. This is particularly to be recommended when the housing of the throttle body is produced by injection molding. By virtue of this configuration, the plastic housing acts as a holder for the magnet shells, reliably preventing fragments of the magnet shells from detaching themselves. Magnet shells are often extremely brittle and normally tend to crack, favoring the detachment of fragments. A fragment detached from a magnet shell can cause a magnetic short circuit which, in turn, causes a reduction in the maximum torque that can be produced. Moreover, a detached fragment can cause mechanical jamming of the motor.

It is advantageous if the housing of the throttle body has holding elements for holding the magnet shells. This makes it a particularly simple matter to insert the magnet shells into the plastic housing after the production of the latter since the spaces provided for the magnet shells are clearly defined by the holding elements. The holding elements are designed in such a way that they ensure adequate retention of the magnet shells on the plastic housing in a particularly reliable manner. It is advantageous here if the holding elements are webs and/or springs produced in one piece with the plastic housing. As an alternative or in addition, it is furthermore also possible for spring elements, such as clips, which can either be formed in one piece with the housing or supplied separately, to be provided as holding elements for holding the magnet shells.

As an alternative to the use of a direct-current motor, as described above, it is advantageous if the electric motor is designed as a so-called electronically commutated electric motor, also referred to by those skilled in the art as an EC motor. In this electronically commutated electric motor, the windings that form the stator are integrated into the plastic housing. The rotor carries the return body and the magnet shells. An electronically commutated electric motor normally has a particularly high torque owing to the particularly close proximity of the rotor and the stator. Moreover, given a controlled supply of power to the windings of the rotor, control of the speed of the electronically commutated electric motor is particularly precise.

Both the direct-current motor and the electronically commutated electric motor can be designed as internal-rotor or external-rotor motors. Depending on the type of power supply, the actuator, in particular the electric motor or an electromagnet, is operated on direct current or alternating current.

It is advantageous if the actuator of the throttle body is provided for the purpose of moving the throttle butterfly as a function of a setpoint input for the power output of the internal combustion engine. By means of this embodiment of the throttle body, the heat generated in the actuator can be dissipated during the operation of the throttle body via the air flowing to the combustion point of the fuel.

The advantages achieved by means of the invention consist, in particular, in that the production and assembly of the throttle body are reduced to a particularly low level by virtue of the integration of a number of functional elements of the actuator into the plastic housing. In this arrangement, the stub pipe and a functional element of the actuator can be arranged in a fixed position relative to one another by means of form-locking joints, as a result of which the amount of space required for the arrangement of these two parts relative to one another is particularly low. Producing the plastic housing by injection molding allows the heat-conducting element and a number of functional elements to be embedded in the housing, thereby ensuring that the time required for assembly of the throttle body is particularly short. In this arrangement, the housing can have a number of recesses, into which moving elements of the throttle body can be inserted with an accurate fit, making the work required for assembly particularly simple. During the operation of the throttle body, the heat generated in the actuator can moreover be dissipated in a particularly reliable manner via the stub pipe, which is connected in a heat-conducting manner to the throttle butterfly of the throttle body. Since the throttle butterfly is here provided for the purpose of controlling the supply of a fluid, the heat generated in the actuator can be dissipated from the throttle body by the fluid.

BRIEF DESCRIPTION OF THE DRAWINGS

An exemplary embodiment of the invention is explained in greater detail by means of a drawing, in which.

Corresponding parts are provided with the same reference numerals in all the figures.

DETAILED DESCRIPTION OF THE PREFERRED EMBODIMENT

Figure 1:
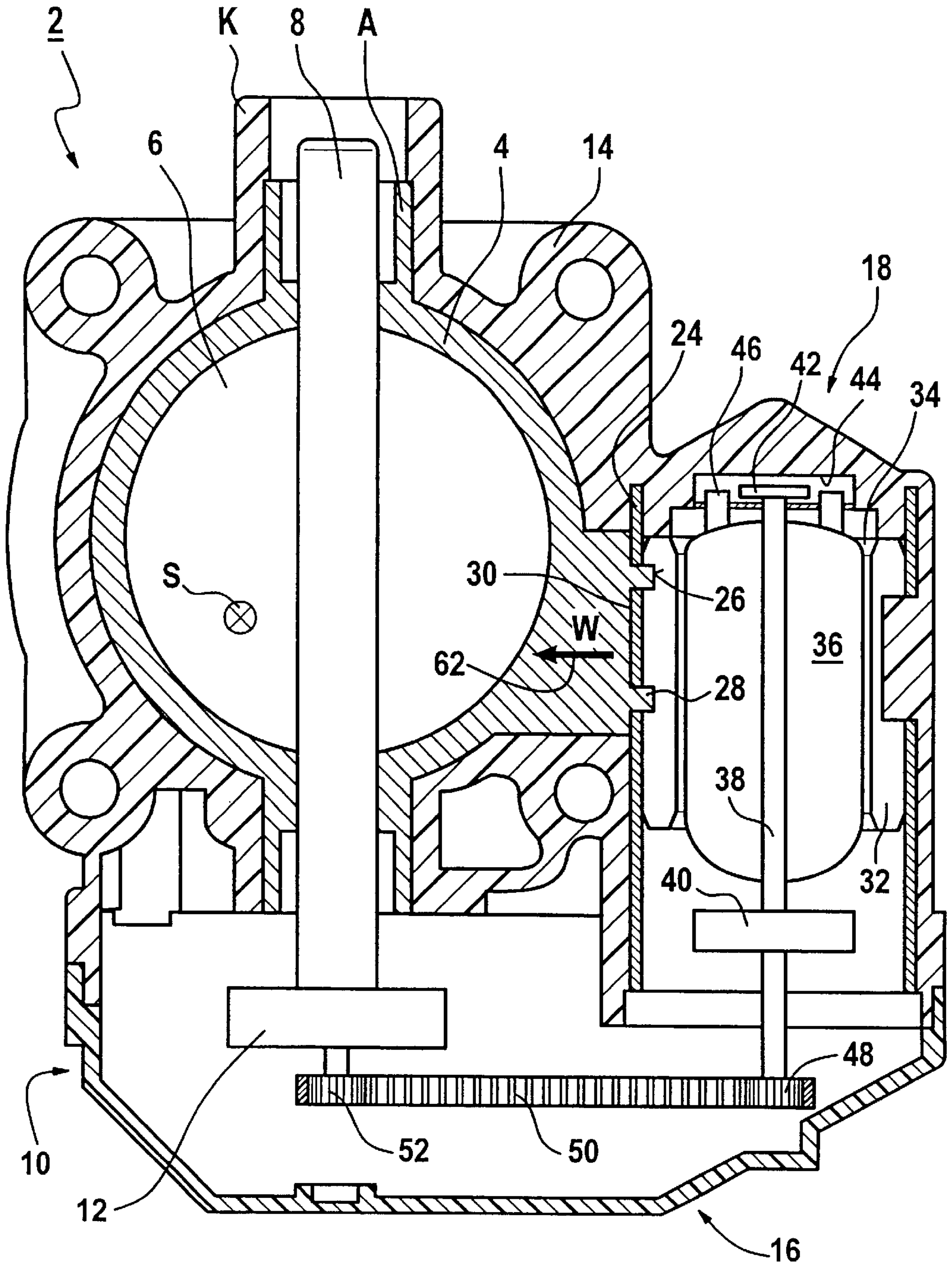
FIG. 1 shows a schematic longitudinal section through a throttle body.

An internal combustion engine provided for driving a vehicle has a throttle body 2 for controlling its power output. The throttle body 2 is mounted in the vehicle in the intake duct of the internal combustion engine and is used to adjust the mass of fluid S, which can be in the form of a fuel/air mixture, to be fed to the point of combustion. This determines the power of the internal combustion engine. The vehicle, the internal combustion engine and the intake duct of the latter are not illustrated specifically in the drawing.

The throttle body 2 shown in FIG. 1 has a heat-conducting component designed as a stub pipe 4. The stub pipe is manufactured essentially from aluminum A and, to control the power of the vehicle, contains a throttle butterfly 6, which closes or opens the aperture of the stub pipe to a greater or lesser extent during the operation of the throttle body 2. The throttle butterfly 6 is arranged on a throttle shaft 8, which is connected to a gear 12 at an input side 10 of the throttle body 2.

The stub pipe 4 is arranged in a housing 14, which is manufactured from plastic K and into which a drive arrangement 16 of the throttle body 2 is integrated. The drive arrangement 16 comprises an actuator 18, which is designed as an electric motor and comprises a number of functional elements. A first functional element of the actuator 18 is a return body 24, which is designed as a pole body and is arranged in the housing 14 in the region of the drive arrangement 16. A pole tube is a return body 24 of one-piece construction. As an alternative, it is also possible for the return body 24 to be of multi-part construction.

The return body 24 of the actuator 18 has a first and a second form-locking connection or dome 26, these having been produced in one piece with the return body 24. Two positive or male domes 28 on the stub pipe 4, likewise produced in one piece with the stub pipe 4, engage in the correspondingly negative or female domes 26 in the return body 24. The return body 24 and the stub pipe 4 can be joined together in a particularly simple manner with the aid of the domes 26 and 28 when it comes to assembly. It is thereby also possible to avoid inaccuracies of fit, caused by manufacturing tolerances, in the connection between the stub pipe 4 and the return body 24 at location 30, as a result of which the connection between the two elements takes up a particularly small amount of space.

Arranged in the housing 14, within the return body 24, there are magnet shells 32 as further functional elements of the actuator 18. The return body 24 and the magnet shells 32 enclose a recess 34 of the housing 14, in which a rotor 36 with a shaft 38 is arranged. In the recess 34 there is furthermore a pole changer 40, which is connected to the shaft 38 of the rotor 36 in a manner not shown specifically. In the region of the pole changer 40, the recess 34 of the housing 14 furthermore has so-called carbon brushes, although this is not shown specifically in the drawing. During the operation of the actuator 18, a voltage is transmitted via the carbon brushes, the function of which could alternatively also be performed by some other voltage-transmitting part, and via the pole changer 40 to the rotor 36, allowing a particular speed of the rotor 36 and its shaft 38 to be set. The rotor 36, the shaft 38, the pole changer 40 and the carbon brushes are further functional elements of the actuator 18.

The actuator 18 furthermore comprises a bearing 42, which is provided to support the shaft 38 of the rotor 36 and is arranged in a second recess 44 of the housing 14. The rotor 36 is fixed in such a way as to allow rotation but prevent axial movement by means of an axial securing means 46 associated with the actuator 18. The shaft 38 of the rotor 36 is connected by means of a gearwheel 48 and a toothed belt 50 to a gearwheel 52, which in turn is connected to the gear 18 of the throttle shaft 8, the manner of connection not being illustrated specifically in the drawing.

Figure 2:
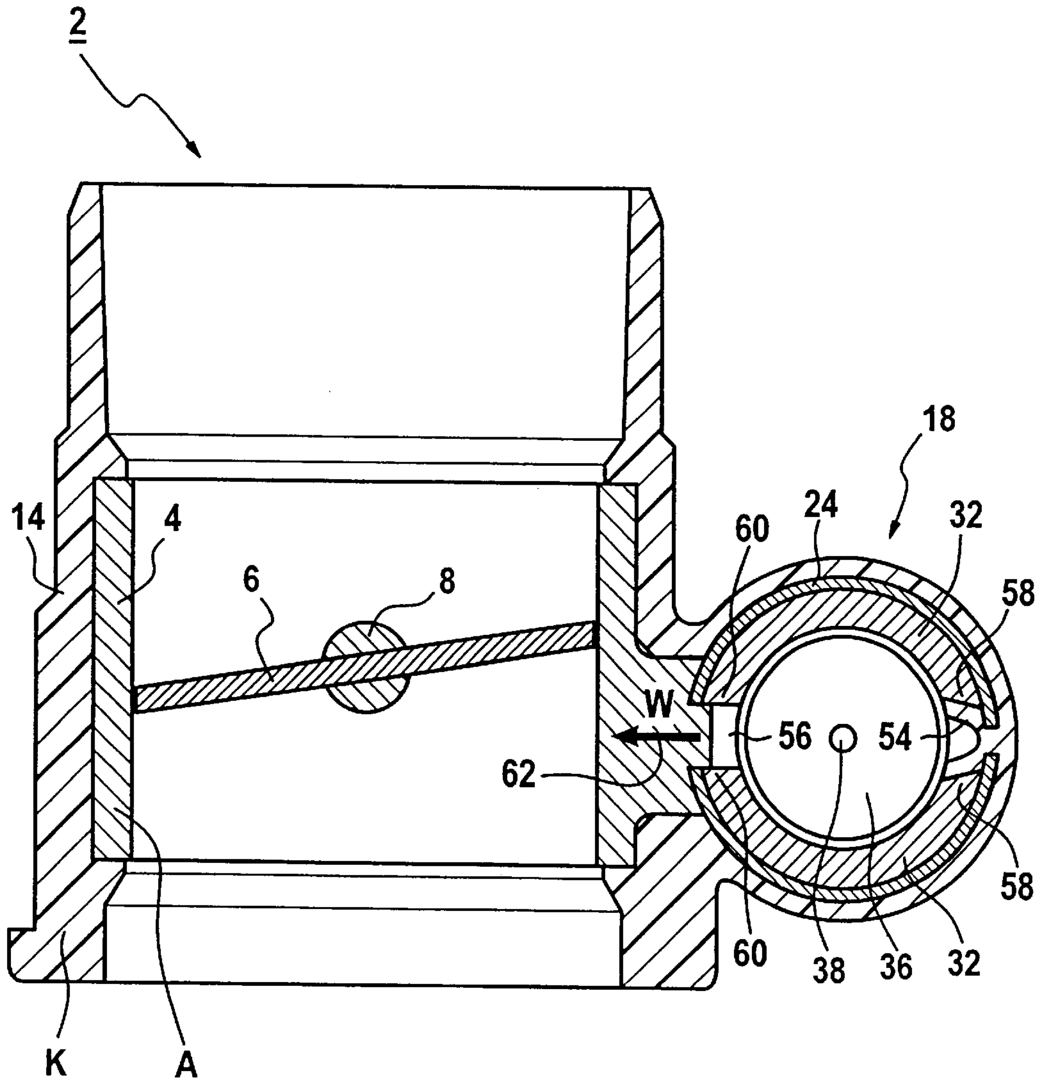
FIG. 2 shows a schematic cross section through the throttle body in FIG. 1.

The approximately circular design of the return body 24 and the approximately semicircular design of the magnet shells 32 can be seen from FIG. 2, which shows a cross section of the throttle body 2 illustrated in FIG. 1. The return body 24, which is approximately circular and is designed as a pole tube, concentrically surrounds the magnet shells 32, which in turn likewise concentrically surround the rotor 36, in which the shaft 38 is arranged.

The magnet shells 32 are fixed in the housing 14 within the recess 34 provided for the rotor 36 by means of holding elements. The holding elements are designed as a spring 54 and a web 56 which, when looking at FIG. 2, extend vertically into FIG. 2 or vertically out of FIG. 2. Both the spring 54 and the web 56 have been produced in one piece with the housing 14 during the production of the latter. As an alternative, however, it is also possible to provide for the holding elements designed as a spring 54 and a web 56 to be retrofitted in the housing 14.

The magnet shells 32 are designed as a first and second approximately semicircular magnet shell 32 but can also comprise more than two parts. The mutually adjacent ends 58 of the two magnet shells 32 are loaded in the circumferential direction of the magnet shells 32 by the spring 54, and the two opposite ends 60 of the magnet shells 32 can be pressed against the web 56, which is designed as a stop. The counterpart to the web 56 is thus the spring 54, which presses the respective magnet shell 32 against the web 56 in the circumferential direction and hence holds the respective magnet shell 32 nonpositively. To improve the holding properties, the longitudinal contours of the web 56 and the adjoining longitudinal contours of the magnet shells 32 can be undercut. This prevents the magnet shells 32 from jumping out of the housing 14 after being inserted into it, insofar as insertion after the production of the housing 14 is envisaged. The outer contours of the spring 54 and of the web 56 are chosen so that, at the maximum, they end with the inward-facing outer surface of the magnet shells 32 in order to avoid impairing the range of motion of the rotor 36.

The housing 14 of the drive arrangement 16 and of the heat-conducting component 4 designed as a stub pipe is produced from plastic K by injection molding. The injection mold provided for the production of the housing 14 defines not only the recesses 34 and 44 but also further recesses in the housing 14 to be produced, into which recesses rigid and/or moving functional elements of the actuator 18 and parts of the drive arrangement 16 and/or of the throttle body 2 can be inserted after the production of the housing 14. The holding elements, i.e. the spring 54 and the web 56, provided to hold the first and the second magnet shell are also produced by the injection mold in such a way that the magnet shells 32 can be secured in the housing 14 with the aid of the spring 54 and the web 56 after the production of the housing 14.

To produce the housing 14, functional elements of the actuator 18 and, if required, further parts of the drive arrangement 16 and/or of the throttle body 2 which are not shown specifically in the drawing are inserted into the injection mold and fixed. Suitable parts for this are, in particular, rigid parts of the actuator 18, of the drive arrangement 16 and/or of the throttle body 2 that are to be embedded firmly in plastic K. The stub pipe 4 and the return body 24 are first of all positioned in a fixed manner relative to one another by means of the domes 26 and 28 and are then inserted into the injection mold. As soon as all the functional elements of the actuator 18 and further parts of the drive arrangement 16, such as cable conduits for supplying power to the actuator 18, have been fixed in the injection mold, the latter is filled with plastic K. In order to avoid electrical short circuits, the material of the plastic is electrically nonconductive.

After the production of the housing 14, which has at least the return body 24 and the stub pipe 4, further functional elements of the actuator 18 and further parts of the drive arrangement 16 are arranged in the housing 14 for the purpose of assembling the drive arrangement 16. The fitting of the functional elements of the actuator 18 and further parts of the drive arrangement 16 is particularly simple thanks to the numerous form-locking features of the housing 14 that the latter has in addition to the recesses 34 and 44. The fitting, in particular retrofitting, of the magnet shells 32 into the housing 14 of the throttle body 2 shown in FIG. 1 with the aid of the spring 54 and the web 56 produced as holding elements in one piece with the housing 14 is envisaged. It is furthermore envisaged that the rotor 36 together with its shaft 38, the pole changer 40, the bearing 42, the axial securing means 46, the gearwheels 48 and 52, the toothed belt 50, the gear 18 the throttle butterfly 6 and the throttle shaft 8 will be introduced into the housing 14 of the drive arrangement after the production of the housing 14.

During the operation of the throttle body 2, the fluid S passes through the throttle butterfly 6, its flow being controlled by the position of the throttle butterfly 6. Here, the fluid S flows vertically into FIG. 1 or vertically out of it. In this arrangement, the position of the throttle butterfly 6 is adjusted by means of the actuator 18 of the drive arrangement 16. For this purpose, the actuator 18 is supplied with power, although this is not shown specifically in the drawing. Supplying the actuator 18 with power causes the rotor 36 of the actuator 18 to perform a rotary motion. The current-carrying functional elements of the actuator 18 and the rotary motion of the rotor 36 generate heat W. This heat W can have the effect of shortening the life of the actuator 18. To avoid this, the return body 24 of the actuator 18, said return body being designed as a pole tube, is connected to the heat-conducting component 4 of the throttle body 2, said component being designed as a stub pipe. By means of the stub pipe 4, which is manufactured from aluminum A, the heat W generated in the actuator 18 during the operation of the actuator 18 is dissipated from the actuator 18 in the direction 62 indicated by means of an arrow in FIG. 1 and FIG. 2. The stub pipe 4 is in turn cooled by the fluid S passing through the throttle body 2, and the stub pipe 4 is thus also reliably protected from overheating.

The throttle body 2 can be produced with a particularly low outlay on production and assembly since a large number of functional elements of the actuator 18 and a large number of parts of the drive arrangement 16 and/or of the throttle body 2 can be integrated into the housing 14 when the housing 14 is produced. In this context, the form-locking connection of the stub pipe 4 to the return body 24 ensures that the space required by the throttle body 2 is particularly small while the outlay for the production of the throttle body 2 is particularly low. At the same time, particularly severe heating of the actuator 18 is avoided during the operation of the throttle body 2 by virtue of the fact that the heat W generated in the actuator 18 during the operation of the actuator 18 can be dissipated from the actuator 18 via the stub pipe 4 and additionally via the fluid S.

I claim:

1. A throttle body for controlling power of an internal combustion engine, in particular a motor vehicle, which has at least one housing (14), a stub pipe (4) arranged in the housing (14) and accommodating a throttle butterfly (6), and an actuator (18), which drives the throttle butterfly (6), wherein the housing (14) is composed of plastic (K), and functional elements of the actuator (18) are arranged in the housing (14) and are at least partially surrounded by plastic (K), the throttle butterfly (6) being surrounded by a heat-conducting stub pipe (4), and a functional element of the actuator (18) and the stub pipe (4) being connected to one another in a heat-conducting manner or being of one-piece;

wherein the functional element of the actuator (18) and the stub pipe (4) are connected directly to one another at at least one point (30), the stub pipe (4) and the functional element of the actuator (18) have means for positioning the stub pipe (4) and the functional element of the actuator (18) relative to one another, and at least one of said means for positioning are domes (26, 28).

2. The throttle body as claimed in claim 1, wherein the stub pipe (4) is composed substantially of metal.

3. The throttle body as claimed in claim 1, wherein the stub pipe (4) is composed substantially of aluminum (A).

4. The throttle body as claimed in claim 1, wherein the means of the stub pipe (4) are embodied in one piece with the stub pipe (4), and the means of the functional element of the actuator (18) are embodied in one piece with the functional element of the actuator (18).

5. The throttle body as claimed in claim 1, wherein the housing (14) is injection molded.

6. The throttle body as claimed in claim 1, wherein the actuator (18) is an electric motor.

7. The throttle body as claimed in claim 6, wherein the electric motor is a direct-current motor, of which at least a return body (24) is arranged in the housing (14).

8. The throttle body as claimed in claim 7, wherein the return body (24) is a pole tube.

9. The throttle body as claimed in claim 7, wherein the functional element of the actuator (18) is the return body (24).

10. The throttle body as claimed in claim 6, wherein magnet shells (32) of the electric motor are arranged at least partially in the housing (14).

11. A throttle body for controlling power of an internal combustion engine, in particular a motor vehicle, which has at least one housing (14), a stub pipe (4) arranged in the housing (14) and accommodating a throttle butterfly (6), and an actuator (18), which drives the throttle butterfly (6), wherein the housing (14) is composed of plastic (K), and functional elements of the actuator (18) are arranged in the housing (14) and are at least partially surrounded by plastic (K), the throttle butterfly (6) being surrounded by a heat-conducting stub pipe (4), and a functional element of the actuator (18) and the stub pipe (4) being connected to one another in a heat-conducting manner or being of one-piece;

wherein the functional element of the actuator (18) and the stub pipe (4) are connected directly to one another at at least one point (30), the actuator (18) is an electric motor, magnet shells (32) of the electric motor are arranged at least partially in the housing (14), and the housing (14) has holding elements for holding said magnet shells (32).

12. The throttle body as claimed in claim 11, wherein the holding elements are springs (54) in one piece with the housing (14).

13. The throttle body as claimed in claim 11, wherein the holding elements are webs (56) in one piece with the housing (14).

14. The throttle body as claimed in claim 6, wherein the electric motor is an electronically commutated electric motor, of which at least windings are arranged in the housing (14).

15. The throttle body as claimed in claim 1, wherein the actuator (18) is for moving the throttle butterfly as a function of a setpoint input for the power output of the internal combustion engine.

16. A throttle body for controlling power of an internal combustion engine, in particular a motor vehicle, which has at least one housing (14), a stub pipe (4) arranged in the housing (14) and accommodating a throttle butterfly (6), and an actuator (18), which drives the throttle butterfly (6), wherein the housing (14) is composed of plastic (K), and functional elements of the actuator (18) are arranged in the housing (14) and are at least partially surrounded by plastic (K), the throttle butterfly (6) being surrounded by a heat-conducting stub pipe (4), and a functional element of the actuator (18) and the stub pipe (4) being connected to one another in a heat-conducting manner or being of one-piece;

wherein the stub pipe (4) and the functional element of the actuator (18) have means for positioning the stub pipe (4) and the functional element of the actuator (18) relative to one another, and at least one of said means for positioning are domes (26, 28).

17. The throttle body as claimed in claim 16, wherein the means of the stub pipe (4) are embodied in one piece with the stub pipe (4), and the means of the functional element of the actuator (18) are embodied in one piece with the functional element of the actuator (18).

18. A throttle body for controlling power of an internal combustion engine, in particular a motor vehicle, which has at least one housing (14), a stub pipe (4) arranged in the housing (14) and accommodating a throttle butterfly (6), and an actuator (18), which drives the throttle butterfly (6), wherein the housing (14) is composed of plastic (K), and functional elements of the actuator (18) are arranged in the housing (14) and are at least partially surrounded by plastic (K), the throttle butterfly (6) being surrounded by a heat-conducting stub pipe (4), and a functional element of the actuator (18) and the stub pipe (4) being connected to one another in a heat-conducting manner or being of one-piece, wherein the actuator (18) is an electric motor, wherein the electric motor is a direct-current motor, of which at least a return body (24) is arranged in the housing (14), and wherein the functional element of the actuator (18) is the return body (24), the stub pipe (4) and the functional element of the actuator (18) have means for positioning the stub pipe (4) and the functional element of the actuator (18) relative to one another, and at least one of said means for positioning are domes (26, 28).

19. A throttle body for controlling power of an internal combustion engine, in particular a motor vehicle, which has at least one housing (14), a stub pipe (4) arranged in the housing (14) and accommodating a throttle butterfly (6), and an actuator (18), which drives the throttle butterfly (6), wherein the housing (14) is composed of plastic (K), and functional elements of the actuator (18) are arranged in the housing (14) and are at least partially surrounded by plastic (K), the throttle butterfly (6) being surrounded by a heat-conducting stub pipe (4), and a functional element of the actuator (18) and the stub pipe (4) being connected to one another in a heat-conducting manner or being of one-piece, wherein the actuator (18) is an electric motor, wherein magnet shells (32) of the electric motor are arranged at least partially in the housing (14), and wherein the housing (14) has holding elements for holding said magnet shells (32).

20. The throttle body as claimed in claim 19, wherein the holding elements are springs (54) in one piece with the housing (14).

21. The throttle body as claimed in claim 19, wherein the holding elements are webs (56) in one piece with the housing (14).

22. A throttle body for controlling power of an internal combustion engine, in particular a motor vehicle, which has at least one housing (14), a stub pipe (4) arranged in the housing (14) and accommodating a throttle butterfly (6), and an actuator (18), which drives the throttle butterfly (6), wherein the housing (14) is composed of plastic (K), and functional elements of the actuator (18) are arranged in the housing (14) and are at least partially surrounded by plastic (K), the throttle butterfly (6) being surrounded by a heat-conducting stub pipe (4), and a functional element of the actuator (18) and the stub pipe (4) being connected to one another in a heat-conducting manner or being of one-piece, wherein the actuator (18) is an electric motor, and wherein the electric motor is an electronically commutated electric motor, of which at least windings are arranged in the housing (14), the stub pipe (4) and the functional element of the actuator (18) have means for positioning the stub pipe (4) and the functional element of the actuator (18) relative to one another, and at least one of said means for positioning are domes (26, 28).

* * * * *